United States Patent
Trieu et al.

(10) Patent No.: US 6,237,055 B1
(45) Date of Patent: May 22, 2001

(54) AVOIDING LIVELOCK WHEN PERFORMING A LONG STREAM OF TRANSACTIONS

(75) Inventors: Tuong Trieu, Folsom; David D. Lent, Placerville; Zohar Bogin, Folsom; Ashish Gadagkar, Sunnyvale, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/205,024

(22) Filed: Dec. 3, 1998

(51) Int. Cl.[7] .......................... G06F 13/362; G06F 13/14
(52) U.S. Cl. ...................... 710/113; 710/128; 710/129; 710/241
(58) Field of Search .................. 710/107–130, 710/240–244

(56) References Cited

U.S. PATENT DOCUMENTS

| | | | |
|---|---|---|---|
| 5,146,564 | * 9/1992 | Evans et al. | 710/57 |
| 5,239,651 | * 8/1993 | Sodos | 710/241 |
| 5,469,435 | * 11/1995 | Krein et al. | 370/462 |
| 5,511,165 | * 4/1996 | Brady et al. | 709/216 |
| 5,546,546 | * 8/1996 | Bell et al. | 710/112 |
| 5,625,779 | * 4/1997 | Solomon et al. | 710/113 |
| 5,721,839 | * 2/1998 | Callison et al. | 710/128 |
| 5,764,929 | * 6/1998 | Kelley et al. | 710/107 |
| 5,850,530 | * 12/1998 | Chen et al. | 710/113 |
| 5,915,104 | * 6/1999 | Miller | 710/129 |
| 5,933,616 | * 8/1999 | Pecone et al. | 710/129 |
| 6,026,460 | * 2/2000 | David et al. | 710/129 |

OTHER PUBLICATIONS

Solaris, E. & Willse, G., "PCI Platform Hardware Architecture," PCI Hardware and Software Architecture & Design, 3rd Edition, Annabooks (1996), pp. 21–23.

\* cited by examiner

*Primary Examiner*—Sumati Lefkowitz
(74) *Attorney, Agent, or Firm*—Blakely, Sokoloff, Taylor & Zafman LLP

(57) ABSTRACT

An arbiter comprising logic circuitry configured to delay granting bus ownership to an agent X in response to receiving a first signal which indicates that a device coupled to the bus is not available to service transactions directed at the device over the bus. For instance, the device may be a bridge and the grant is delayed if an inbound pipe of the bridge is full. The arbiter may provide a borrowed grant to an outbound pipe of the device for performing a transaction on the bus while waiting for an inbound pipe of the device to become available.

21 Claims, 6 Drawing Sheets

AVOIDING LIVELOCK WHEN PERFORMING A LONG STREAM OF TRANSACTIONS

BACKGROUND INFORMATION

1. Field of the Invention

This invention is generally related to computer bus transactions, and more particularly to techniques for avoiding livelock when performing a relatively long stream of transactions across a bridge.

2. Description of Related Art

Peripheral devices such as disk controllers or network interface cards often generate a long stream of read or write transactions. The transactions are often directed at a main memory of the computer system. In certain architectures, the transactions must cross a bridge between a system bus to which the peripheral devices are coupled and the memory. The bridge has an inbound pipe for temporarily holding the data and request packets of multiple transactions before they are forwarded to the memory.

Sometimes the pipe becomes full before the stream can be completed. This may occur because the depth of the pipe is relatively small with respect to the number of transactions in the stream, and/or because the memory is relatively slow in emptying the pipe. When this happens, the peripheral device is refused access to the bridge and its inbound pipe. According to some bus arbitration protocols, the device must then relinquish the system bus to give a different device or agent a chance to own the bus. This is known as fair arbitration.

In certain situations, the pipe may still be full when a second agent is granted ownership of the bus. Thus, if the second agent also needs to access the pipe, then the bridge will refuse access. As required by fair arbitration, the second agent must now relinquish the bus so that other agents may then be granted ownership of the bus.

Eventually, the first agent being the peripheral device regains ownership of the bus. By now, however, assume that the pipe has emptied some, such that the first agent can resume its transaction stream. But since the stream is relatively long, the pipe once again becomes full and the first agent must relinquish the bus. Although arbitration may now move to the second agent, the pipe may still be full and the bridge must again refuse access to the second agent. The cycle of the previous paragraph may repeat several times, thereby starving the second agent while allowing the first agent to progress with its long transaction stream.

The undesirable condition described above is known as livelock, where the second agent cannot progress even though it is granted ownership of the bus. In addition to reducing the performance of the second agent, livelock wastes valuable bus cycles when the second agent requests and is granted the bus only to be refused access to the bridge, with no data being transferred over the bus.

One possible solution for dealing with the livelock problem is configuring the bridge with a larger pipe so that the entire stream can be accepted by the bridge. This may be prohibitively expensive, because the transaction streams described above may be very long such that no practical pipe could hold the entire stream. Alternatively, the memory and peripheral devices may be reconfigured to split the transaction stream into smaller portions, allowing ownership of the bus to pass to another agent between portions. This solution, however, requires altering many different types of memory and peripheral devices, all of which may be developed by different manufacturers and according to different standards. This may also undesirably increase the overall cost of ownership of the system by requiring many components of the system to be redesigned.

Therefore, there is a need to remedy the livelock condition described above using a relatively low-cost technique that does not require extensive reconfiguration of existing peripheral devices.

SUMMARY

What is disclosed is an arbiter comprising logic circuitry configured to delay granting bus ownership to an agent X in response to receiving a first signal which indicates that a device coupled to the bus is not available to service transactions directed at the device over the bus.

These as well as features and advantages of other embodiments of the invention will be more apparent by referring to the claims, the written description, and the drawings below.

DETAILED DESCRIPTION

As briefly summarized above, an embodiment of the invention is directed at an improved bus arbiter appearing as part of a chip set used to interface a processor and memory with peripheral devices in a computer system. The embodiment is particularly effective in eliminating the livelock condition described in the Background section, by delaying the grant of bus ownership to an agent until there is assurance that a particular device, the device being the expected recipient of a transaction to be initiated by the agent, is available to service the transaction.

For purposes of explanation, specific embodiments have been set forth below to provide a thorough understanding of the invention. However, as understood by one skilled in the art, from reading this disclosure, the invention may be practiced without such details. Furthermore, well-known elements, devices, process, steps, and the like, are not set forth in detail in order to avoid obscuring the invention.

Figure 1:
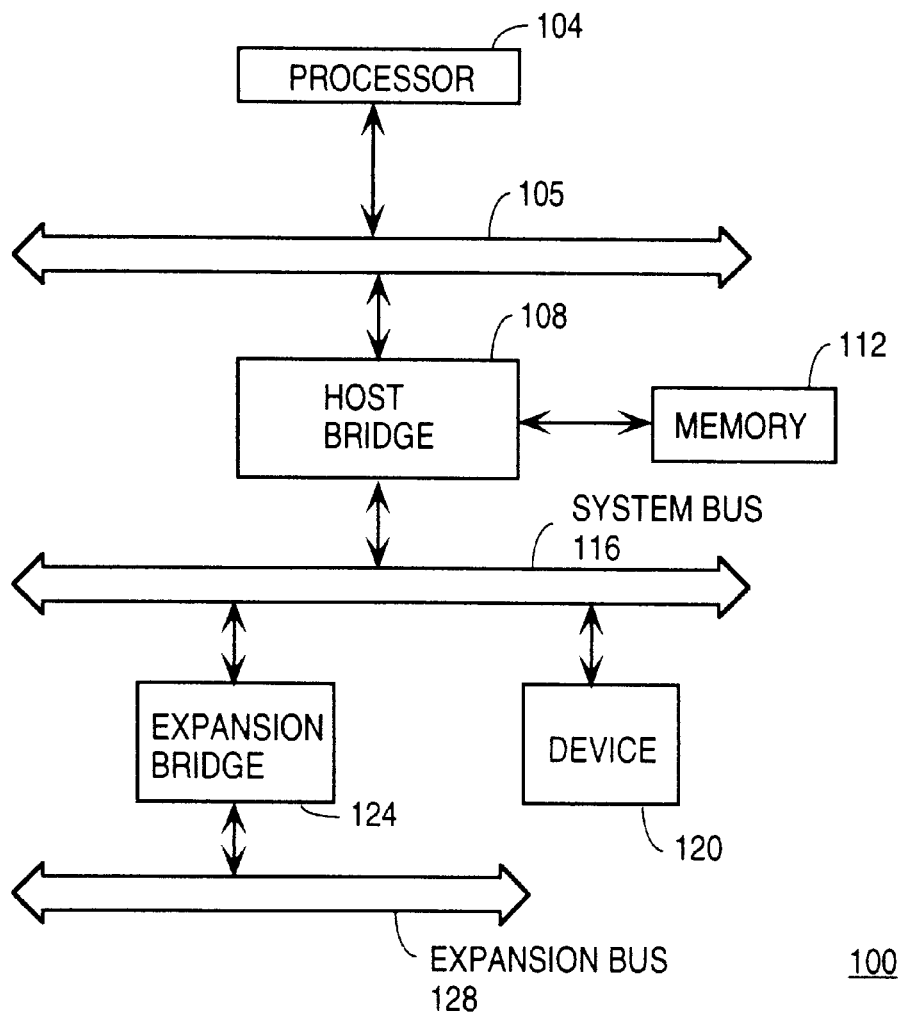
FIG. 1 illustrates a logical block diagram of a computer system that may be configured according to an embodiment of the invention.

FIG. 1 illustrates a logical block diagram of a computer system 100 configured according to an embodiment of the invention. The system 100 comprises a number of buses coupled to each other using bridges. The buses include a host bus 105 to which is coupled at least one processor 104 (although other devices including additional processors may also be added to the host bus), a system bus 116, and an expansion bus 124 which may be used to access devices that operate according to a different bus protocol than the system bus. A peripheral device 120 such as a mass storage controller or network interface card is coupled to the system bus. An expansion bridge 124 connects the system bus 116 to the expansion bus 128. Transactions between devices on the system bus 116 and devices on the host bus 105 are accomplished using transfer logic that may include a host bridge 108. The bridge 108 would also provide for data transfers to and from the memory 112. In a particular embodiment, the bridge 108 may be part of a chip set that includes the expansion bridge 124 as well as any other control logic or registers. The chip set transports upstream transactions initiated on either the expansion bus 128 or the system bus 116 to the host bus 105 or the memory 112. Similarly, downstream transactions from the host bus and memory are transported to the system or expansion bus.

Figure 2:
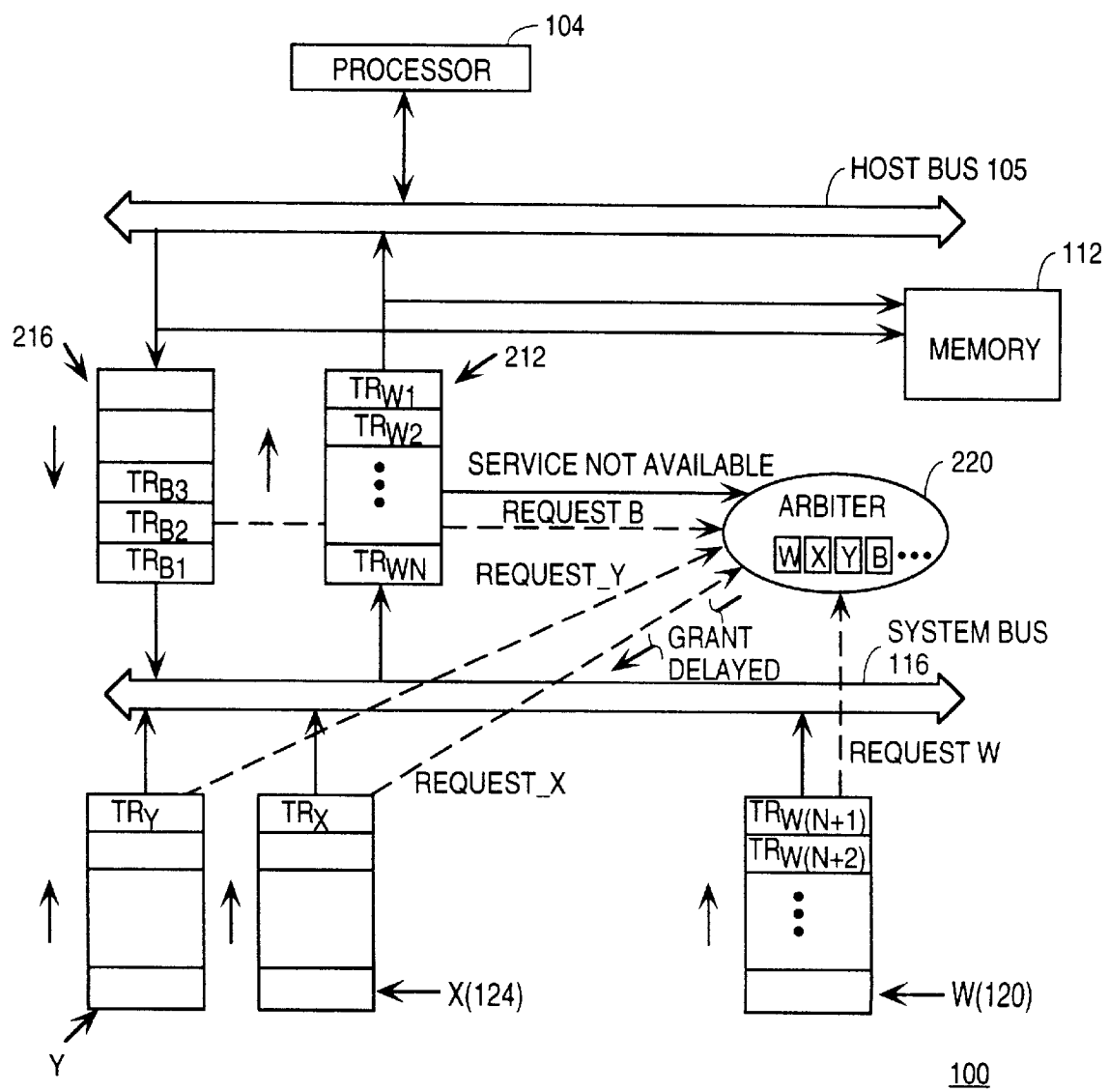
FIG. 2 shows the computer system in more detail, including the interaction between agents according to an embodiment of the invention that avoids livelock.

FIG. 2 gives a more detailed view of the computer system 100. Bus agents X and W are coupled to the system bus 116. These are outbound pipes holding transaction information and data for a number of transactions to be performed on the bus 116. Referring briefly to FIG. 1, the bus agent X may be the outbound pipe of the expansion bridge 124 while the agent W may be for the peripheral device 120. A host bridge inbound pipe 212 buffers transactions that are being transported from the system bus 116 to either the memory 112 or the host bus 105, while a host bridge outbound pipe 216 does the same but in the reverse direction. Agent X may be viewed as the "victim" agent having relatively few transactions $TR_x$ to perform as compared to agent W, the "dominant" agent which is in the process of performing a long stream of transactions $TRW_1, TRW_2, \ldots TRW_{N+2}$.

Arbitration on the system bus 116 is implemented using an arbiter 220. As provided by an embodiment of the invention, the arbiter 220 comprises logic circuitry that is configured to delay granting bus ownership to a next intended agent in response to receiving a first signal which indicates that a device coupled to the bus 116 is not available to service transactions directed at the device over the system bus 116. In this embodiment, the next intended agent is agent X as shown in FIG. 2. The first signal indicating Service Not Available is asserted by the host bridge inbound pipe 212, indicating that the pipe is full. A second signal (in this example being the first signal deasserted) indicates that the inbound pipe 212 is available to buffer a transaction. This means that the arbiter 220 should proceed normally, for instance in a round-robin fashion, and grant ownership to the next intended agent. By waiting until inbound service is available before granting ownership to agent X, livelock of agent X, the victim agent, is avoided while the dominant agent is in the middle of a long stream of transactions, where both agents are targeting the same device in this case the host bridge and, in particular, its inbound pipe 212.

Sometimes the victim agent has a transaction which does not require access to the same device as the dominant agent. In such cases, delaying the grant to the victim agent according to the technique described above may appear at first to adversely affect performance. However, it has been observed that the majority of transactions on the system bus 116 are upstream transactions to the memory 112 which must use the host bridge inbound pipe 212. As such, the increased delay in performing a few non-bridged transactions of the victim agent should be outweighed by the performance improvement obtained due to fewer livelock conditions.

Figure 3:
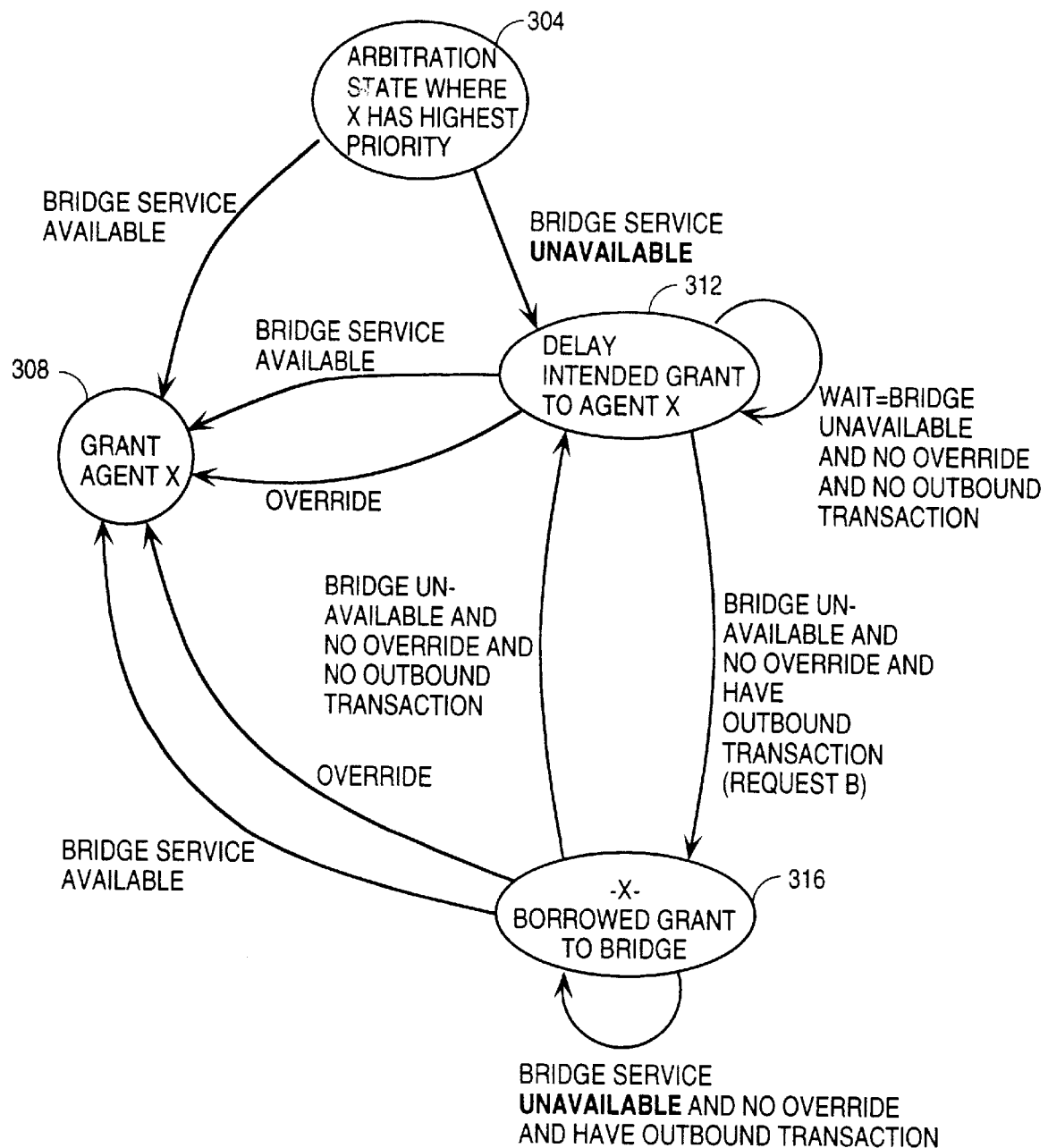
FIG. 3 shows a bubble diagram of the different states of a bus arbiter according to an embodiment of the invention.

The functionality of the arbiter 220 described in relation to FIG. 2 may be readily implemented using, for instance, a state machine. FIG. 3 shows a bubble diagram of the different states of the state machine of the bus arbiter 220 according an embodiment of the invention. At some point during operation of the computer system 100, the arbiter arrives at the arbitration state 304 in which the next intended grant will be to the agent X. Instead of blindly granting agent X's request, the arbiter enters the Grant Agent X state 308 only if service by the host bridge is available. If not, the arbiter enters the Delay state 312, where the arbiter waits until one of several events occur.

The arbiter 220 leaves the Delay state 312 in response to a first signal indicating that the host bridge's inbound service is available. This puts the arbiter in the Grant Agent X state 308. For more efficient use of the system bus 116, however, the arbiter state machine may be configured with the additional Borrowed Grant to Bridge state 316. This state allows the arbiter to make a borrowed grant to an agent of the host bridge while waiting for inbound service to be available. Note that the agent X had priority over the host bridge prior to the arbiter receiving the first signal. In the embodiment of FIG. 2, the arbiter enters the Borrowed Grant state in response to a Request_B signal which indicates that a transaction TRB is ready to be performed at the head of the host bridge outbound pipe 216.

Figure 5:
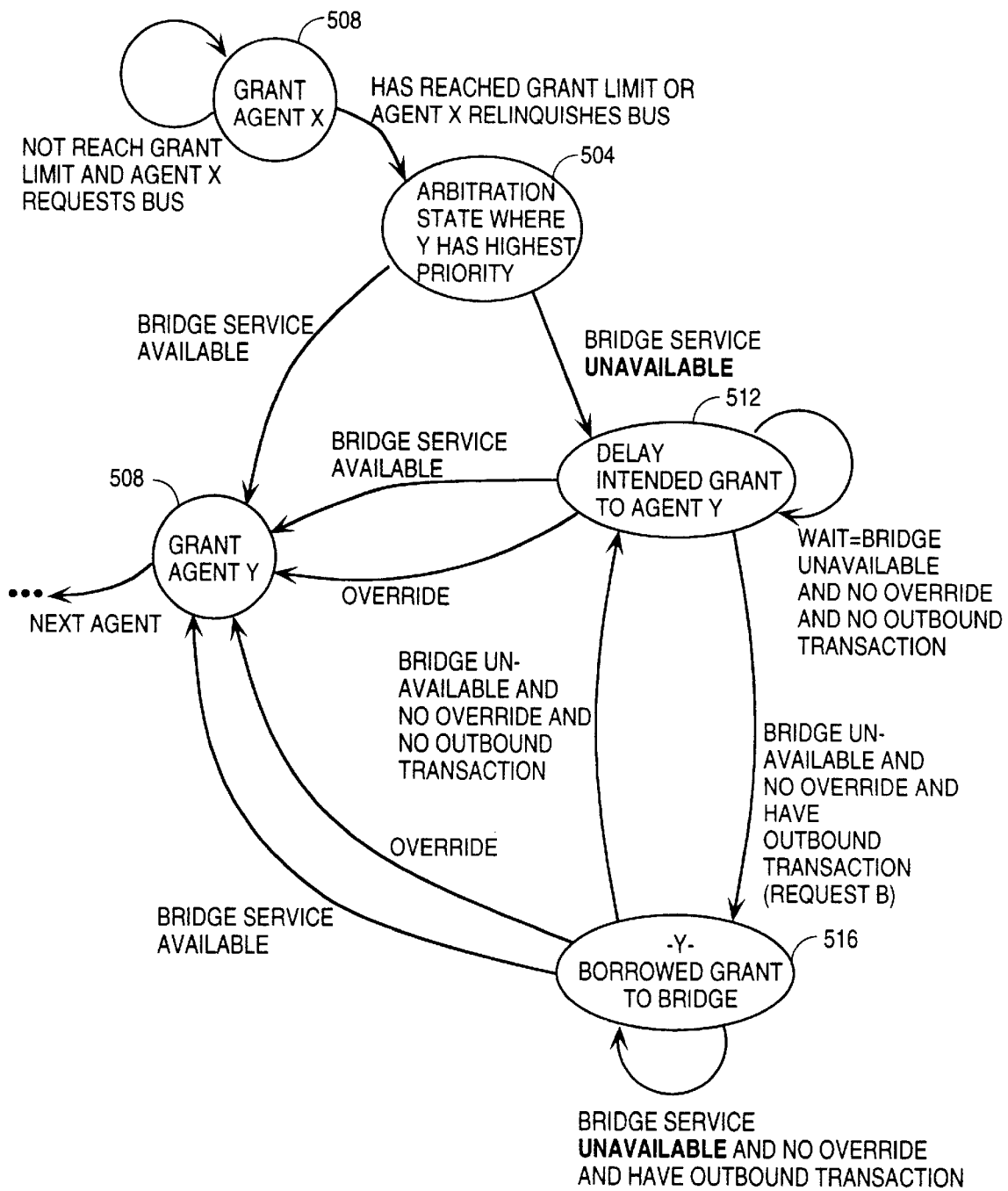
FIG. 5 shows a bubble diagram of a set of arbiter states for agent Y being symmetric to those in FIG. 3.

After having granted the system bus 116 to the host bridge 108 on a borrowed basis, the arbiter continues to be sensitive to the status of the inbound pipe 212. The arbiter continues making multiple borrowed grants to the host bridge outbound pipe 216 while in the Borrowed Grant state 316, servicing transactions $TR_{B2}, TR_{B3}, \ldots$, as long as the host bridge inbound pipe 212 continues to be unavailable and as long as the outbound pipe 216 requests the bus 116. Should the host bridge 108 not request the bus while the inbound pipe 212 continues to be unavailable, then the arbiter returns to the Delay state 312. Should the inbound pipe 212 become available instead, then the arbiter removes the host bridge borrowed grant and proceeds to grant agent X in state 308. With the exception of the host bridge master, for every bus master requester, the arbiter maintains a symmetric set of these common states. Each set tracks, for its respective agent, the actual grant, the delay intended grant, and the delay intended grant while borrowing the grant to the host bridge. FIG. 5 shows the transition of a grant sequence from agent X to agent Y. The states in FIG. 5 are self-explanatory in view of the description of FIG. 3 above.

Figure 4:
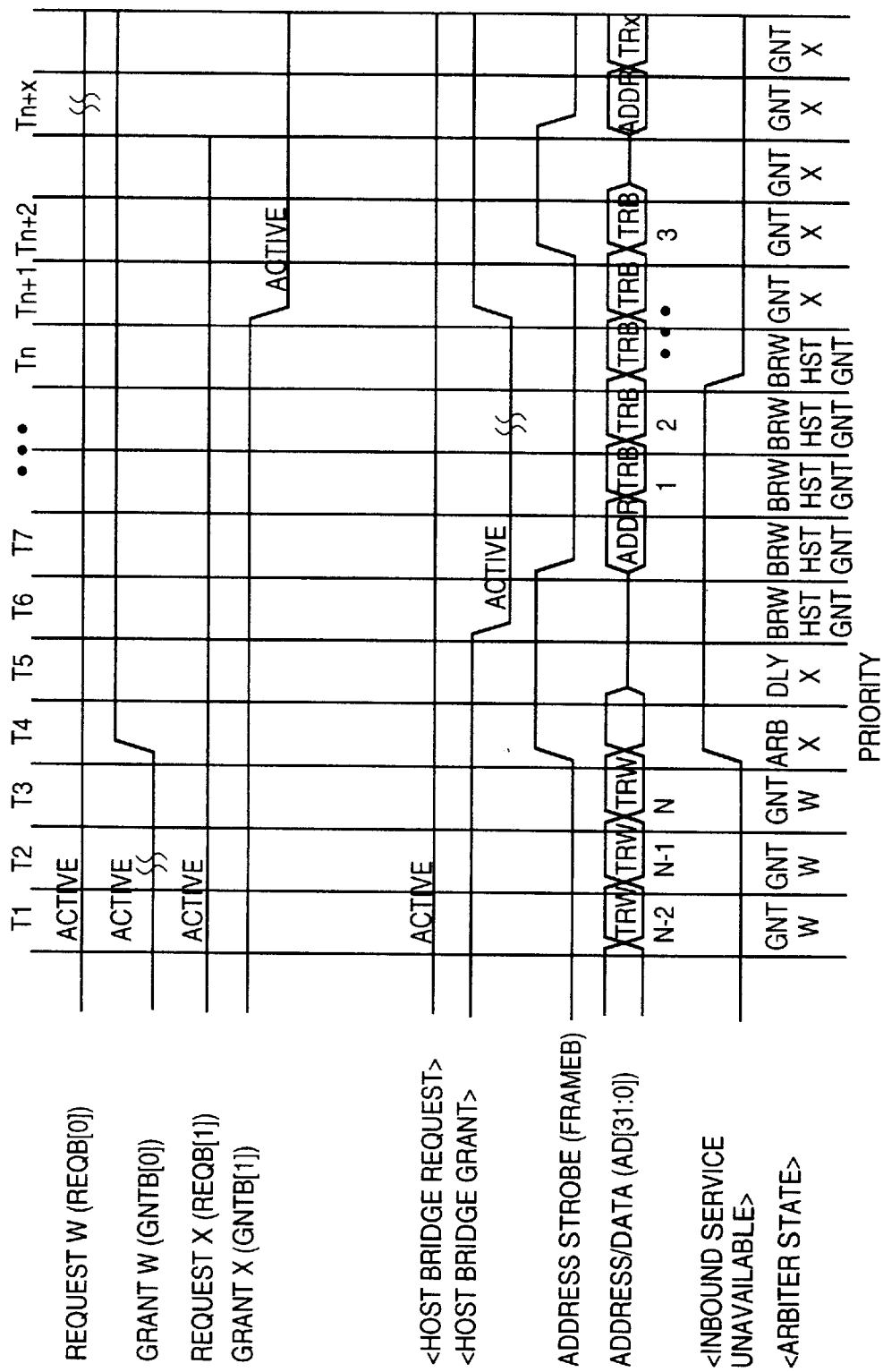
FIG. 4 illustrates a timing diagram of a sequence of operations according to an embodiment of the invention.

FIG. 4 illustrates a sequence of transactions on the system bus 116, according to an embodiment of the invention. In $T_1$ through $T_3$, agent W (see FIG. 2) owns bus and processes transaction N−2, N−1, and N. In $T_3$, a target limit is reached, being the inbound pipe 212 full, and a host bridge target signals a retry/disconnect (not shown). In $T_4$, agent W begins relinquishing the bus while the arbiter reaches the arbitration state where agent X is the next intended agent to be granted. In $T_4$, host bridge inbound pipe 212 is full so the arbiter makes a transition to Delay Grant X state 312 by $T_5$. In $T_5$, inbound pipe 212 remains full while host bridge (e.g., outbound pipe 216) requests the bus 116. Thus, the arbiter proceeds to borrow a grant to the host bridge in $T_6$ through $T_n$ by moving to state X Borrowed Grant To Bridge 316. Up to $T_{n-1}$, inbound pipe 212 remains unavailable while host bridge outbound pipe 216 continues to request the bus and processes transactions $TR_{B1}, TR_{B2},$ and $TR_{B3}$. At $T_n$, inbound pipe 212 becomes available and the arbiter proceeds to grant agent X and to remove the borrowed grant to host bridge by transitioning the state Grant X 308 by $T_{n+1}$. In $T_{n+1}$, host bridge begins to relinquish the bus due to the grant removal, successfully completes the last transaction $TR_{B3}$ by $T_{n+2}$ and is off the bus. In $T_{n+x}$, with the bus at idle and its grant being active, agent X begins proceeding its transaction $TR_x$ which at this point is guaranteed to be accepted by the inbound pipe 212 of the host bridge.

Referring back to FIG. 1, in certain embodiments of the invention, the system bus 116 may comply with the popular

*Peripheral Components Interconnect (PCI) Specification*, Revision 2.1, Jun. 1, 1995. The arbiter 220, the host bridge 108, and the expansion bridge 124 are all part a chip set. The expansion bridge 124 may be one which provides access to the expansion bus 128 and legacy devices which comply with the older Industry Standard Architecture (ISA) specification. In such a case, there is a special scenario depicted in FIG. 6 that can lead to the host bridge inbound pipe 212 being unable to drain, and hence creating an undesirable deadlock condition on the system bus 116 because the arbiter stays in the Delay state 312 indefinitely and thus can never grant the bus to the agent X or any other agents. This is caused in part by the requirements of the ISA specification as explained below, when an ISA-compliant legacy device being the I/O bridge 624 is transacting with a third PCI device 646.

Figure 6:
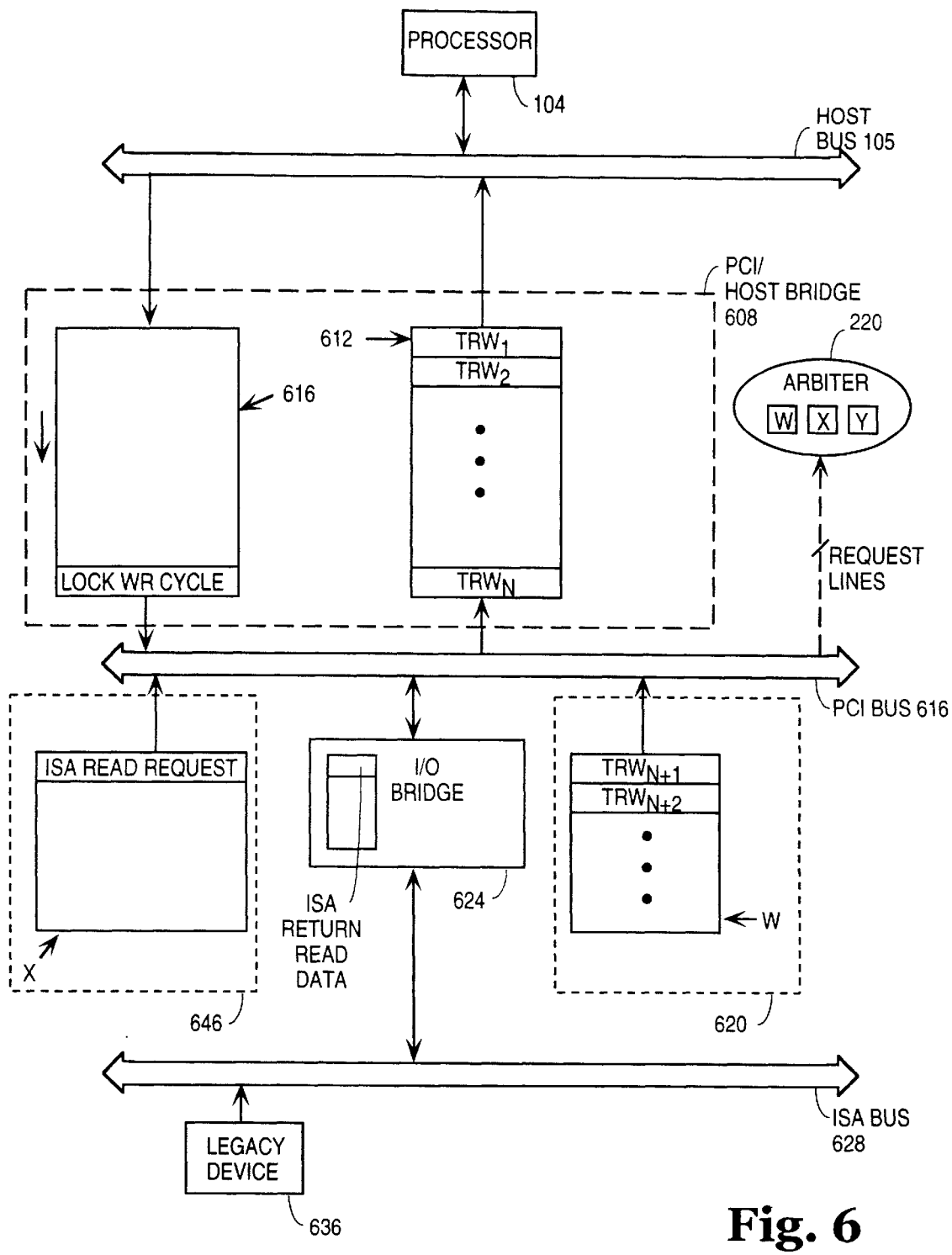
FIG. 6 is a block diagram of a computer system according to another embodiment of the invention that avoids a deadlock condition.

Referring to FIG. 6, the special scenario involves the following conditions. For this example, let agent X be the outbound pipe of a third PCI device 646. An I/O bridge 624 is in the process of a transaction between a legacy device 636 and the third PCI device 646. The processor 104 begins an atomic transaction directed at some device on the ISA bus 628. Such a transaction may involve a lock sequence used to ensure data coherency for the transaction. The host bus 105 is thus locked, unavailable to others except the processor 104, until the lock sequence is complete. Also, assume that TRW1 at the head of inbound pipe 612 of the PCI/host bridge 608 is directed at the host bus 105 for snooping. Under these circumstances, a PCI/host bridge inbound pipe 612 cannot drain into the host bus 105 until the lock sequence is complete.

Next assume that a lock cycle is at the head of the PCI/host bridge outbound pipe 616. This lock cycle happens to be a non-posted write portion of a read-to-memory/write-to-system-bus split lock sequence. To perform the lock cycle, the PCI/host bridge 608 will request ownership of the PCI bus 616. Assume now that the next intended grant of the arbiter is to agent X (third PCI device 646), but the PCI/host bridge inbound pipe 612 has become full. Thus, the arbiter 220 is in the Delay state 312 (see FIG. 3). Since the PCI/host bridge 608 has an outbound lock WR cycle ready to be performed, the arbiter 220 moves to the Borrowed Grant state 316, and thereby grants ownership of the PCI bus 616 to the PCI/host bridge 608 to perform the lock cycle.

Although the PCI/host bridge 608 owns the bus 616, the lock cycle is refused by the I/O bridge 624, because, limited by the nuances of the ISA legacy device 636, the I/O bridge must wait for return data to the third PCI device 646 to be claimed before it can proceed with another transaction. This return data was processed as a delayed read transaction, and can cause side effects if discarded and re-read from the ISA device. Hence, the I/O bridge does not have the option to discard the return data to make itself available. However, agent X (third PCI device 646) cannot obtain the system bus 616 because the arbiter 220 is in the borrowed state 316. Thus, the system 100 is now in a deadlock condition, because the I/O bridge 624 will continue to refuse service indefinitely.

To alleviate the deadlock condition, an Override event is provided as shown in FIG. 3 which forces the arbiter 220 to transition to the Grant Agent X state, regardless of the current state and the inbound service being unavailable. An override event can be a signal sensing a state of the host bus 105 as being locked. This signal is communicated from the host bus interface logic (not shown) in the PCI/host bridge 608 to the arbiter 220. The override event allows the third PCI device 646 to proceed and claim return data from the I/O bridge 624 to complete the legacy transaction. Once the legacy transaction is complete, the I/O bridge can accept the lock cycle and eventually the lock cycle is completed.

The embodiments of the invention described above are, of course, subject to some variations in structure and implementation. For instance, although some of the techniques were illustrated using a chip set that complies with the PCI and ISA specifications, one of ordinary skill in the art will recognize that the invention may be practiced in other settings as well, including other bus specifications and non-bridge devices. Therefore, the scope of the invention should be determined not by the embodiments illustrated but by the appended claims and their legal equivalents.

What is claimed is:

1. An arbiter comprising:

logic circuitry configured to (1) delay granting bus ownership of a first bus to an agent X in response to receiving a first signal which indicates that a device coupled between the first bus and a second bus is not available to service transactions directed at the device over the first bus, and (2) grant ownership of the first bus to the agent X, regardless of the first signal, in response to an override signal being asserted which indicates that the second bus is locked.

2. The arbiter of claim 1 wherein the first signal further indicates that a pipe for holding transaction information relating to one or more transactions involving the device and the first bus is full.

3. The arbiter of claim 1 wherein the logic circuitry is further configured to grant ownership to the agent X in response to a second signal indicating that the device is available to service transactions directed at the device over the first bus.

4. The arbiter of claim 3 wherein the second signal further indicates that a pipe of the device for holding transaction information relating to one or more transactions involving the device and the first bus is not full.

5. The arbiter of claim 1 wherein the logic circuitry is further configured to grant bus ownership to the device prior to granting the agent X if the pipe remains full and if the device has requested ownership of the first bus.

6. The arbiter of claim 5 wherein before receiving the first signal and before granting ownership to the device, the agent X had priority over the device.

7. A set of integrated circuit (IC) devices comprising:

a bridge for transporting transactions between a first bus and a second bus; and a bus arbiter for granting ownership of the second bus to one of a plurality of agents, the arbiter to (1) delay an intended grant to an agent X in response to receiving a first signal which indicates that the bridge is not available to service a transaction from the second bus and (2) grant ownership of the second bus to the agent X regardless of the first signal, in response to an override signal being asserted which indicates that the first bus is locked.

8. The set of IC devices in claim 7 wherein the bridge is for being coupled to a memory and for transporting upstream transactions from the second bus to the memory.

9. The set of IC devices in claim 8 wherein the bridge further comprises:

an inbound pipe for holding transaction information and data relating to one or more transactions for transferring data from the second bus to the memory and the first bus; and the first signal is to further indicate that the inbound pipe is full.

10. The set of IC devices in claim 9 wherein the bridge further comprises:
  an outbound pipe for holding transaction information and data relating to one or more transactions that transfer data from the first bus to the second bus; and
  the arbiter to grant ownership of the second bus to the outbound pipe prior to granting the agent X if the inbound pipe remains full and if the outbound pipe has requested ownership of the second bus.

11. The set of IC devices in claim 10 wherein before receiving the first signal and before granting ownership to the outbound pipe, the agent X had priority over the outbound pipe.

12. A computer system comprising:
  first bus;
  second bus;
  dominant agent coupled to the second bus;
  victim agent coupled to the second bus;
  memory; and
  chip set coupled to the memory and the first and second buses for porting upstream transactions initiated by the victim and dominant agents from the second bus to the first bus and the memory, the chip set having an inbound pipe coupled to the first bus, the second bus, and the memory, the pipe for holding transaction information and data relating to one or more upstream transactions,
  the chip set to receive a victim's request from the victim agent to own the second bus, refuse service to the dominant agent in response to the inbound pipe being full, lay an intended grant of the victim's request, and then grant the victim's request when the inbound pipe is no longer full without granting any intervening requests to own the second bus while delaying, wherein the chip set is to grant ownership of the second bus to the dominant agent regardless of the inbound pipe being full, in response to an override signal being asserted which indicates that the first bus is locked.

13. A computer system comprising:
  a processor coupled to a first bus;
  a memory;
  a second bus;
  first and second agents coupled to the second bus;
  transfer logic coupled between the first bus and the second bus, for transporting transactions initiated by the agents on the second bus to the processor and the memory, and having an inbound pipe for holding transaction information and data relating to said transactions; and
  a bus arbiter for granting ownership of the second bus to one of a plurality of agents, the arbiter to (1) delay an intended grant to an agent X in response to receiving a first signal which indicates that the bridge is not available to service a transaction from the second bus and (2) grant ownership of the second bus to the agent X, regardless of the first signal, in response to an override signal being asserted which indicates that the first bus is locked, wherein the transfer logic refuses service to the second agent in response to the inbound pipe becoming full while the second agent is performing one of a sequence of W transactions directed at the device, the second agent relinquishes the bus, the first agent being a next intended grantee of the bus, and then the transfer logic is granted the bus and performs a B transaction over the bus while the inbound pipe remains full, and then the first agent receives a grant of the bus and performs an X transaction that accesses the inbound pipe being no longer full.

14. The system of claim 13 wherein the first bus is locked by the processor to perform a plurality of downstream transactions directed to an agent coupled to the second bus.

15. The system of claim 13 wherein the transfer logic further comprises an outbound pipe for holding transaction information and data relating to transactions initiated by the processor and directed at the second bus, the B transaction being at a head of the outbound pipe.

16. A method comprising:
  delaying a grant of ownership of a first bus to an agent X in response to receiving a first signal which indicates that a device coupled between a first bus and a second bus is not available to service transactions directed to the device over the first bus; and
  granting ownership of the first bus to the agent X, regardless of the first signal, in response to an override signal being asserted which indicates that the second bus is locked.

17. The method of claim 16 wherein the first signal further indicates that a pipe, for holding transaction information relating to one or more transactions involving the device and the bus, is full.

18. The method of claim 17 further comprising:
  granting ownership to the agent X in response to a second signal indicating that the device is available to service transactions directed at the device over the first bus.

19. The method of claim 18 wherein the second signal further indicates that a pipe of the device for holding transaction information relating to one or more transactions involving the device and the first bus is not full.

20. The method of claim 19 further comprising:
  granting bus ownership to the device prior to granting the agent X if the pipe remains full and if the device has requested ownership of the first bus.

21. The method of claim 20 wherein before receiving the first signal and before granting ownership to the device, the agent X had priority over the device.

* * * * *